(12) United States Patent
Liu et al.

(10) Patent No.: US 9,025,910 B2
(45) Date of Patent: May 5, 2015

(54) IMAGE RETARGETING QUALITY ASSESSMENT

(71) Applicants: Futurewei Technologies, Inc., Plano, TX (US); Nanyang Technological University, Singapore (SG)

(72) Inventors: Anmin Liu, Shenzhen (CN); Weisi Lin, Singapore (SG); Chen Hai, Shenzhen (CN); Chen-Xiong Zhang, Plano, TX (US)

(73) Assignees: Futurewei Technologies, Inc., Plano, TX (US); Nanyang Technological University, Singapore (SG)

( * ) Notice: Subject to any disclaimer, the term of this patent is extended or adjusted under 35 U.S.C. 154(b) by 78 days.

(21) Appl. No.: 13/713,110

(22) Filed: Dec. 13, 2012

(65) Prior Publication Data

US 2014/0169662 A1   Jun. 19, 2014

(51) Int. Cl.
*G06K 9/32* (2006.01)
*G06K 9/66* (2006.01)
*H04N 19/40* (2014.01)
*H04N 19/154* (2014.01)
*H04N 19/167* (2014.01)
*H04N 19/59* (2014.01)
*H04N 19/119* (2014.01)
*H04N 19/61* (2014.01)
*H04N 19/23* (2014.01)

(52) U.S. Cl.
CPC .. *G06K 9/32* (2013.01); *G06K 9/66* (2013.01); *H04N 19/40* (2014.11); *H04N 19/119* (2014.11); *H04N 19/61* (2014.11); *H04N 19/154* (2014.11); *H04N 19/167* (2014.11); *H04N 19/23* (2014.11); *H04N 19/59* (2014.11)

(58) Field of Classification Search
None
See application file for complete search history.

(56) References Cited

U.S. PATENT DOCUMENTS 8,180,177 B1   5/2012   Intwala
2011/0141143 A1   6/2011   Peterson et al.

FOREIGN PATENT DOCUMENTS

CN   101055560 A   10/2007

OTHER PUBLICATIONS

Cover, T., et al., "Elements of Information Theory," A Wiley-Interscience Publication, John Wiley & Sons, Inc., 1991, 578 pages.
Shawe-Taylor, J., et al., "Kernel Methods for Pattern Analysis," Cambridge University Press, 2004, 482 pages.

(Continued)

*Primary Examiner* — Daniel Mariam
*Assistant Examiner* — David Perlman
(74) *Attorney, Agent, or Firm* — Conley Rose, P.C.; Grant Rodolph; Brandt D. Howell

(57) ABSTRACT

A method of performing an image retargeting quality assessment comprising comparing an original image and a retargeted image in a frequency domain, wherein the retargeted image is obtained by performing a retargeting algorithm on the original image. The disclosure also includes an apparatus comprising a processor configured to perform an image retargeting quality assessment, and compare an original image and a retargeted image in a spatial domain, wherein the retargeted image is obtained by performing a retargeting algorithm on the original image, and wherein comparing the original image and the retargeted image in the spatial domain comprises comparing the original image and the retargeted image to determine an amount of shape distortion between the images.

15 Claims, 7 Drawing Sheets

(56) References Cited

OTHER PUBLICATIONS

Scholkopf, B., et al., "Learning with Kernels: Support Vector Machines, Regularization, Optimization, and Beyond," The MIT Press, 2002, 652 pages.
"Final Report form the Video Quality Experts Group on the Validation of Objective Models of Video Quality Assessment, Phase II © 2003 VQEG," Aug. 25, 2003, 68 pages.
Rubinstein, M., et al., "Improved Seam Carving for Video Retargeting," ACM Transactions on Graphics (SIGGRAPH), vol. 27, No. 3, 2008, 9 pages.
Rubinstein, M., et al., "Multi-operator Media Retargeting," ACM Transactions on Graphics (TOG), Proceedings of ACM SIGGRAPH 2009, vol. 28, No. 3, Article 23, Aug. 2009, 11 pages.
Rubinstein, M., et al., "A Comparative Study of Image Retargeting," ACM Transactions on Graphics (TOG), Proceedings of ACM SIGGRAPH Asia 2010, vol. 29, No. 6, Article 160, Dec. 2010, 9 pages.
Wang, Z., et al., "Image Quality Assessment: From Error Visibility to Structural Similarity," IEEE Transactions on Image Processing, vol. 13, No. 4, Apr. 2004, pp. 600-612.
Simakov, D., et al., "Summarizing Visual Data Using Bidirectional Similarity," Proceedings, IEEE Conference Computer Vision & Pattern Recognition (CVPR), 2008, pp. 1-8.
Barnes, C., et al., "PatchMatch: A Randomized Correspondence Algorithm for Structural Image Editing," ACM Transactions on Graphics, vol. 28, No. 3, Article 24, Aug. 2009, 12 pages.
Pele, O., et al., "Fast and Robust Earth Mover's Distances," Computer Vision, 2009 IEEE 12th International Conference, Sep. 29, 2009-Oct. 2, 2009, pp. 460-467.
Liu, C. et al "SIFT Flow: Dense Correspondence Across Different Scenes," ECCV, Computer Vision, Lecture Notes in Computer Science, vol. 5304, 2008, pp. 28-42.
Liu, Y., et al., "Image Retargeting Quality Assessment," EUROGRAPHICS 2011, M. Chen and O. Deussen, Eds., vol. 30, No. 2, 2011, 10 pages.
Manjunath, B.S., et al., "Color and Texture Descriptors," IEEE Transactions on Circuits and Systems for Video Technology, vol. 11, No. 6, Jun. 2001, pp. 703-715.
Lowe, D., "Distinctive Image Features from Scale-Invariant Keypoints," International Journal of Computer Vision 60 (2), 2004, pp. 91-110.
Rubenstein, M., et al., "RetargetMe—A Benchmark for Image Retargeting," http://people.csail.mit.edu/mrub/retargetme/, downloaded from the Internet Nov. 5, 2012, 2 pages.
Sheikh, H.R., et al., "No-Reference Quality Assessment Using Natural Scene Statistics: JPEG2000," IEEE Transactions on Image Processing, vol. 14, No. 11, Nov. 2005, pp. 1918-1927.
Saad, M.A., et al., "A DCT Statistics-Based Blind Image Quality Index," IEEE Signal Processing Letters, vol. 17, No. 6, Jun. 2010, pp. 583-586.
Wang, Z., et al., "Reduced-Reference Image Quality Assessment Using a Wavelet-Domain Natural Image Statistic Model," Presented at IS&T/SPIE's 17th Annual Symposium on Electronic Imaging, San Jose, CA, Jan. 17-20, 2005, Published in Human Vision and Electronic Imaging X, Proc., SPIE vol. 5666, 11 pages.
Sheikh, H.R., et al., "Image Information and Visual Quality," IEEE Transactions on Image Processing, vol. 15, No. 2, Feb. 2006, pp. 430-444.
Chou, C., et al., "A Perceptually Tuned Subband Image Coder Based on the Measure of Just-Noticeable-Distortion Profile," IEEE Transactions on Circuits and Systems for Video Technology, vol. 5, No. 6, Dec. 1995, pp. 467-476.
Liu, A., et al., "Just Noticeable Difference for Images with Decomposition Model for Separating Edge and Textured Regions," IEEE Transactions on Circuits and Systems for Video Technology, vol. 20, No. 11, Nov. 2010, pp. 1648-1652.
Liu, T., et al., "A Multi-Metric Fusion Approach to Visual Quality Assessment," IEEE 2011 Third International Workshop on Quality of Multimedia Experience, 2011, 6 pages.
Narwaria, M., et al., "SVD-Based Quality Metric for Image and Video Using Machine Learning," IEEE Transactions on Systems, Man, and Cybernetics—Part B: Cybernetics, vol. 42, No. 2, Apr. 2012, pp. 347-364.
Narwaria, M., et al., "Scalable Image Quality Assessment with 2D Mel-Cepstrum and Machine Learning Approach," Elsevier, Pattern Recognition 45 (2012), Jun. 19, 2011, pp. 299-313.
Smola, A.J., et al., "A Tutorial on Support Vector Regression," Statistics and Computing 14, 2004, pp. 199-222.
Narwaria, M., et al., "Low-Complexity Video Quality Assessment Using Temporal Quality Variations," IEEE Transactions on Multimedia, vol. 14, No. 3, Jun. 2012, pp. 525-535.
Hsu, C., et al., "A Practical Guide to Support Vector Classification," Apr. 15, 2010, 16 pages.
Ma, L., et al., "Study of Subjective and Objective Quality Assessment of Retargeted Images," IEEE 2012 International Symposium on Circuits and Systems (ISCAS), May 20-23, 2012, pp. 2677-2680.
Lu, Z., et al., "Modeling Visual Attention's Modulatory Aftereffects on Visual Sensitivity and Quality Evaluation," IEEE Transactions on Image Processing, vol. 14, No. 11, Nov. 2005, pp. 1928-1942.
"PyVision: Computer Vision Toolkit," http://sourceforge.net/apps/mediawiki/pyvision/index.php?title=Main_Page, downloaded from the Internet Nov. 5, 2012, 3 pages.
Viola, P., et al., "Rapid Object Detection using a Boosted Cascade of Simple Features," Proceeding of the 2001 IEEE Computer Society Conference on Computer Vision and Pattern Recognition, CPVR vol. 1, 2001, pp. I-511-I-518.
Kasutani, E., et al., "The MPEG-7 Color Layout Descriptor: A Compact Image Feature Description for High-Speed Image/Video Segment Retrieval," IEEE, 2001 International Conference, Proceedings on Image Processing, vol. 1, 2001, pp. 674-677.
Simoncelli, E.P., et al., "Shiftable Multiscale Transforms," IEEE Transactions on Information Theory, vol. 38, No. 2, Mar. 1992, pp. 587-607.
Huang, G., et al., "Extreme Learning Machine for Regression and Multiclass Classification," IEEE Transactions on Systems, Man, and Cybernetics—Part B: Cybernetics, vol. 42, No. 2, Apr. 2012, pp. 513-529.
Huang, G., et al., "Extreme Learning Machine: Theory and Applications," Elsevier, Neurocomputing 70 (2006), May 16, 2006, pp. 489-501.
Sayyareh, A., "A New Upper Bound for Kullback-Leibler Divergence," Applied Mathematical Sciences, vol. 5, No. 67, 2011, pp. 3303-3317.
Scholkopf, B., et al., "A Short Introduction to Learning with Kernels," Advanced Lectures on Machine Learning, LNAI, Mendelson, S., et al., Eds., 2003, pp. 41-64.
Sewell, M., "Kernel Methods," Apr. 2007 (revised Jul. 2009), 15 pages.
Partial English Translation and Abstract of Chinese Patent Application No. CN101055560A, Jun. 20, 2014, 5 pages.
Foreign Communication From a Counterpart Application, PCT Application No. PCT/CN2013/089148, International Search Report dated Mar. 20, 2014, 7 pages.
Foreign Communication From a Counterpart Application, PCT Application No. PCT/CN2013/089148, Written Opinion dated Mar. 20, 2014, 5 pages.

IMAGE RETARGETING QUALITY ASSESSMENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The presence of a wide variety of mobile devices comprising a wide variety of screen sizes and resolutions has increased the need for image retargeting. Image retargeting may include an algorithm for resizing an image. A single image may be retargeted into a plurality of resolutions for use on various user equipment (UE) screens. Image retargeting may result in a loss of image data, shape distortion, or both, which may result in an unpleasant image. Various image retargeting algorithms have been developed in an attempt to minimize loss and/or corruption of image data, but no single image retargeting algorithm has been determined to be superior to any other image retargeting algorithm in all cases.

SUMMARY

In one embodiment, the disclosure includes a method of performing an image retargeting quality assessment comprising comparing an original image and a retargeted image in a frequency domain, wherein the retargeted image is obtained by performing a retargeting algorithm on the original image.

In another embodiment, the disclosure includes an apparatus comprising a processor configured to perform an image retargeting quality assessment, and compare an original image and a retargeted image in a spatial domain, wherein the retargeted image is obtained by performing a retargeting algorithm on the original image, and wherein comparing the original image and the retargeted image in the spatial domain comprises comparing the original image and the retargeted image to determine an amount of shape distortion between the images.

In another embodiment, the disclosure also includes an apparatus comprising a processor configured to compute a plurality of image retargeting quality assessment score vectors for a plurality of retargeted images, and adaptively learn an image retargeting quality assessment score fusion model using empirical data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method of performing image retargeting quality assessment to determine which retargeting algorithm is most likely to result in a retargeted image that will be most appealing to a user. The method of assessing the quality of an image comprises comparing an original image and a retargeted image in both the frequency domain and the spatial domain. Both images may be converted into the frequency domain and described in terms of coefficients. The difference between coefficients may be quantified as a frequency domain quality score ($Q_{fsc}$). In the spatial domain, shape distortion may be measured using the Scale-invariant feature transform (SIFT) algorithm and/or SIFT flow algorithm to determine the degree of movement of pixels between the original image and the retargeting image. The resulting shape distortion may be quantified as a shape distortion quality score ($Q_{ss}$). Also in the spatial domain, visual content changes may be quantified locally as a local content quality score ($Q_{slc}$) and globally as a global content quality score ($Q_{sgc}$). The $Q_{fsc}$, $Q_{ss}$, $Q_{slc}$, and $Q_{sgc}$ may be used together to assess the quality of a retargeted image. The quality score may be weighted to achieve a total quality score (Q). The proper weights given to each quality score in a total quality equation may be determined by machine learning. The total Q may be used to automatically rate retargeting algorithms and automatically select the highest quality retargeted image from a plurality of retargeted images.

Figure 1:
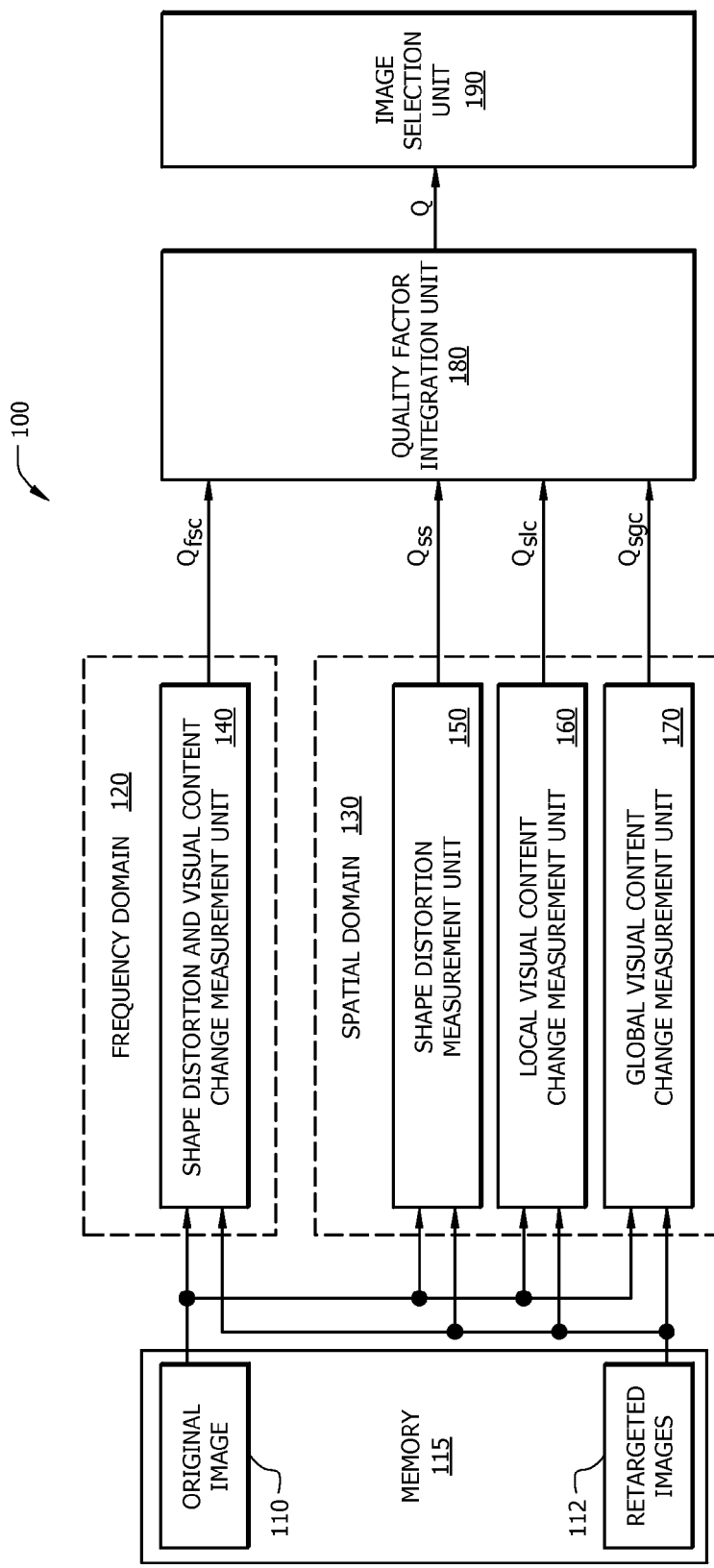
FIG. 1 is a schematic diagram of a system for image retargeting quality assessment.

FIG. 1 is a schematic diagram of a system 100 for image retargeting quality assessment. System 100 may be implemented on a network device, such as a user equipment (UE), a network element (NE), a server, and/or other computer. System 100 may receive an original image 110 and a plurality of associated retargeted images 112 as input, which are discussed in conjunction with FIG. 2 and may be stored in memory 115. The system 100 may compare the images 110 and 112 in a spatial domain 130 and in a frequency domain 120. The spatial domain 130 may be a domain for analyzing an image in a two dimensional (2D) and/or three dimensional (3D) visual image space. For example, a 2D image analyzed in the spatial domain may be analyzed in terms of coordinates and/or locations of pixels and/or other visual objects in the visual 2D space. The frequency domain 120 may be a domain for analyzing an image in terms of variation over time. For example, an image may comprise a plurality of colors of varying intensity. When iteratively read across the spatial domain 130, an image's color intensity may change over time. Such changes over time may be represented in the frequency domain 120.

Figure 3:
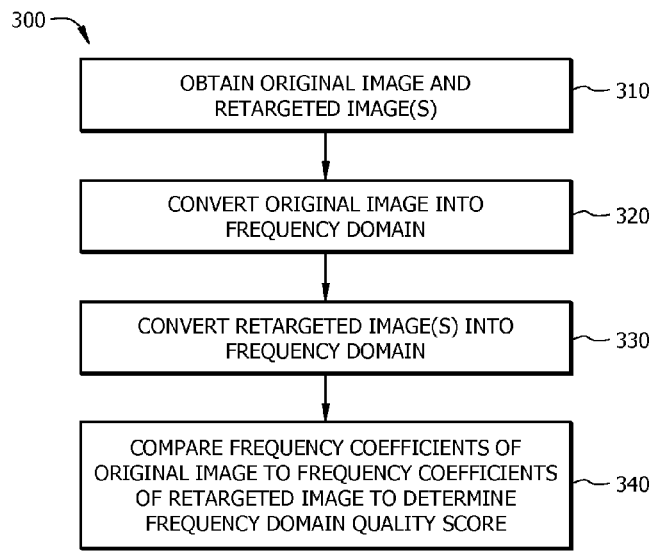
FIG. 3 is a flow chart of a method for determining a frequency domain quality score.

The system 100 may comprise a shape distortion and visual content change measurement unit 140 configured to compare shape distortions and visual content changes in the frequency domain 120 to determine a $Q_{fsc}$, which is discussed in conjunction with FIG. 3. The system 100 may also comprise a shape distortion measurement unit 150, a local visual content change measurement unit 160, and a global visual content change measurement unit 170 which may be configured to measure shape distortions and visual content changes in the spatial domain 130. Specifically, the shape distortion measurement unit 150 may be configured to measure shape distortions to determine a $Q_{ss}$, which is discussed in conjunction with FIG. 5. The local visual content change measurement unit 160 may be configured to measure local visual content changes to determine a $Q_{slc}$, which is discussed in conjunction with FIG. 7. The global visual content change measurement unit 170 may be configured to measure global visual content changes to determine a $Q_{sgc}$, which is discussed in conjunction with FIG. 8. The system 100 may also comprise a quality factor integration unit 180 configured to integrate the quality scores from units 140, 150, 160, and 170 to determine a Q for a retargeted image, which is discussed in conjunction with FIG. 9. The system may also comprise an image selection unit 190, which may be configured to use Q to automatically select a preferred retargeted image from a plurality of retargeted images.

Figure 2:
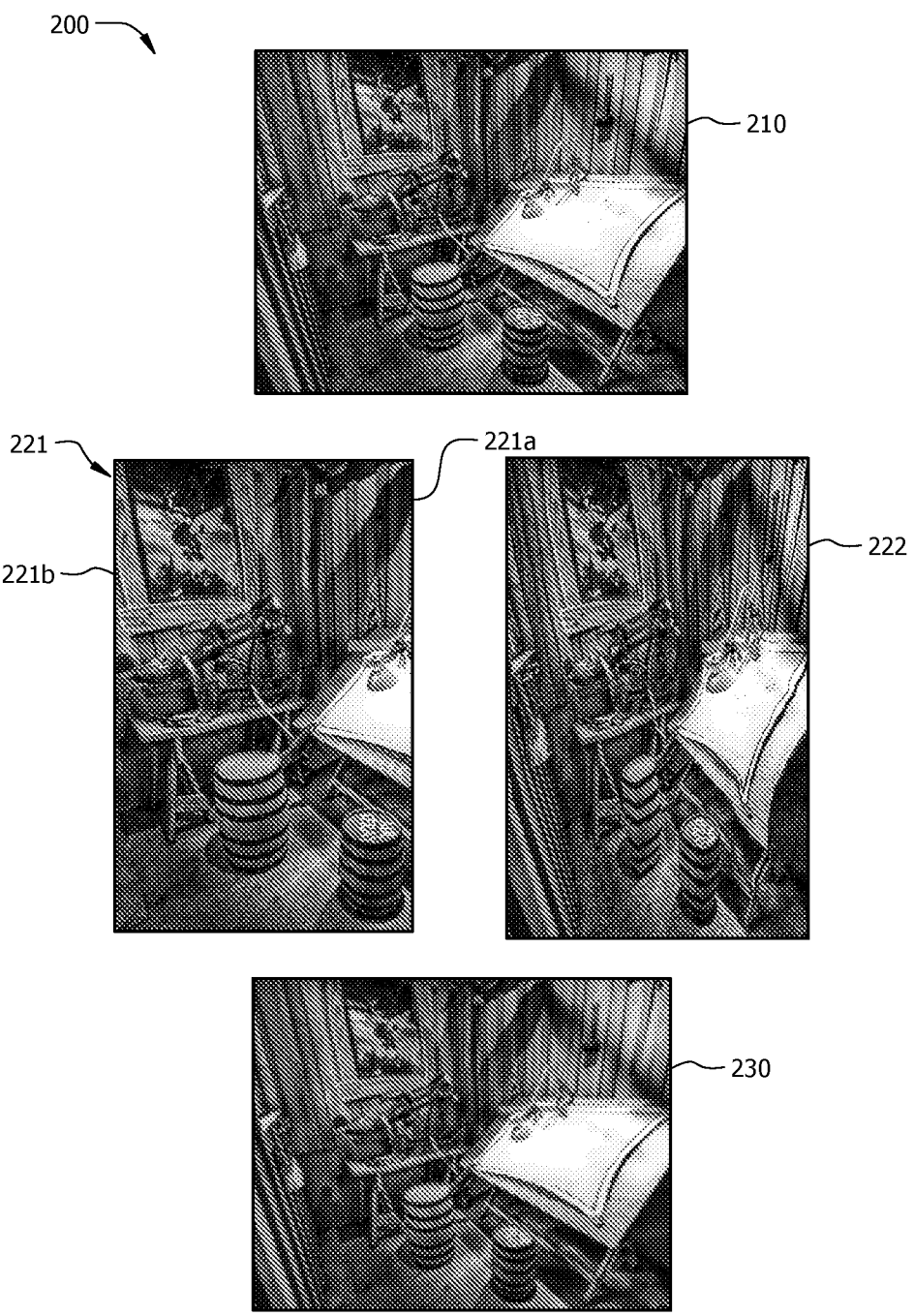
FIG. 2 is an embodiment of example images.

FIG. 2 is an embodiment of example images 200. Example images 200 may comprise original image 210 (which may be original image 110), retargeted images 221 and 222 (which may be retargeted images 112), and reconstructed image 230. As discussed above, it may be advantageous to automatically retarget an original image for use in conjunction with various UE's and/or other devices comprising displays with varying screen sizes, resolutions, etc. As an example, system 100 may compare both retargeted image 221, 222, and/or other images resulting from other retargeting algorithms to original image 210 to automatically determine which image a user would most likely prefer.

Original image 210 is an example of an original image that may be displayed to a user. A system, for example system 100, may retarget original image 210 for display. In order to retarget an image to a smaller size, a system may remove pixels, which may be referred to as cropping and may result in data loss, displace pixels, which may result in image shape distortions, or combinations thereof. Retargeted image 221 may be the result of cropping original image 210. Retargeted image 221 may comprise a right side 221*a* and a left side 221*b*. As shown in FIG. 2, retargeted image 221 may comprise minimal or no visual shape distortion when compared to original image 210. However, retargeted image 221 may comprise a loss of visual data on both the right side 221*a* and the left side 221*b* when compared to the original image 210. Retargeted image 222 may be the result of retargeting original image 210 through a seam carving algorithm. As shown in FIG. 2, retargeted image 222 may comprise substantially the same visual data as original image 210. However, in retargeted image 222, pixels of original image 210 may be shifted in the horizontal axis to compress image 222, resulting in visual shape distortion. Reconstructed image 230 may be the result of reconstructing original image 210 from retargeted image 221 using a patchmatch algorithm or other image construction algorithm, image patches from retargeted image 221, and other visual data from original image 210. A patchmatch algorithm may be a randomized correspondence algorithm for structural editing. A patch may be a portion of an image.

FIG. 3 is a flow chart of a method 300 for determining a $Q_{fsc}$, for example by shape distortion and visual content change measurement unit 140. At block 310, the method 300 may obtain an original image, such as original image 110 and/or 210, and a retargeted image, such as retargeted images 112, 221, and/or 222. At block 320, the original image may be converted into the frequency domain, and at block 330 the retargeted images also may be converted into the frequency domain. The original and retargeted images may be converted into the frequency domain by representing each pixel in the spatial domain as a change in intensity value over a specified distance. Conversions may be accomplished by means of a transform, such as a Fourier transform, a discrete wavelet transform, or other transform. Converting an image into the frequency domain may result in a description of the image using a plurality of coefficients, for example haar wavelet, diagonal subband, etc.

At block 340, the frequency coefficients of the original image and the retargeted images may be compared to determine differences between the images in the spatial domain such as spatial shape distortion and visual content changes. For example, a histogram of the original image frequency coefficients ($f_O$) may be separated into a plurality of equally spaced bins ($f_O(i)$). A histogram of the retargeted images' frequency coefficients ($f_R$) also may be separated into a plurality of equally spaced bins ($f_R(i)$) that correspond to $f_O(i)$. The frequency coefficients may be compared by summing a logarithm of the ratio of each $f_O(i)$ to each corresponding $f_R(i)$ and dividing the sum by the number of bins ($N_f$). In an embodiment, there may be one hundred bins (e.g. $N_f$ may be set to a value of one hundred. The result may be a quality score in the frequency domain $Q_{fsc}$. $Q_{fsc}$ may be expressed using the equation:

$$Q_{fsc\_sub} = \frac{1}{N_f} \sum_{i=1}^{N_f} \log \frac{f_o(i)}{f_R(i)}$$

The equation for $Q_{fsc}$ may asymptotically approach a Kullback-Leibler divergence which may be used to measure the difference between two distributions. The $Q_{fsc}$ equation may apply a 3-scale, 4-orientation steerable pyramid wavelet transform to decompose the image into a plurality of subbands. Then, frequency domain estimated quality may be derived by summarizing the scores from for each subband ($Q_{fsc\_sub}$). Natural image statistics may be used to estimate the distribution of pixels of the original image in the spatial domain based on the type of image employed. Natural image estimation may not be necessary in the frequency domain as the distribution may be computed directly from the original image. $Q_{fsc}$ may be used for images such as images of people, natural scenes, and/or artificial objects such as buildings and cartoons. $Q_{fsc}$ may not rely on processes such as image matching and image reconstruction, and therefore, may avoid associated measurement errors. $Q_{fsc}$ may be used to compensate for errors inherent in spatial domain quality scores.

Figure 4:
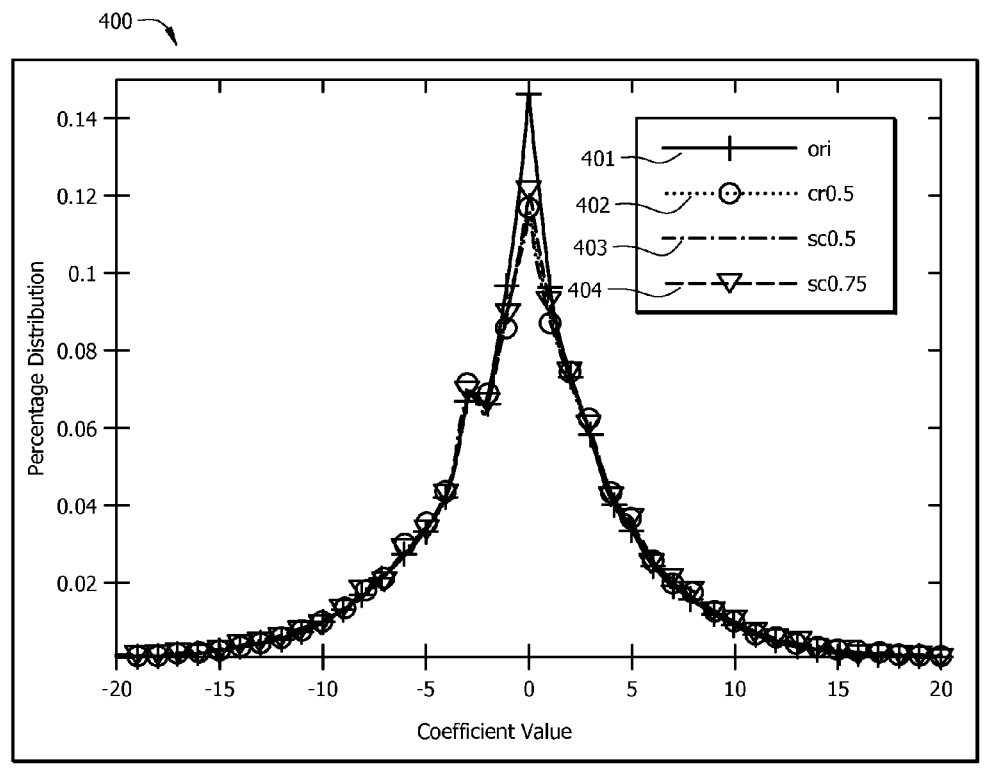
FIG. 4 is a graph of an embodiment of frequency domain coefficient distributions.

FIG. 4 is a graph 400 of an embodiment of frequency domain coefficient distributions. Graph 400 may comprise an original image frequency distribution 401 (e.g. 210 in FIG. 2), a retargeted image frequency distribution based on cropping to half the size of the original image 402 (e.g. 221 in FIG. 2), a retargeted image frequency distribution based on seam carving to half the size of the original image 403 (e.g. 221 in FIG. 2), and a retargeted image frequency distribution based on seam carving to 0.75 the size of the original image 404 (image not shown). Graph 400 may comprise a coefficient axis and a distribution axis. The coefficient axis may represent unit-less values of image wavelet transform coefficients and the distribution axis may represent the percentage distribution (e.g. histogram) of such coefficients. For example, in original image frequency distribution 401 about fourteen percent of the image wavelet transform coefficients are about zero. As shown in graph 400, original image frequency distribution 401 may comprise a higher percentage frequency of coefficients of about zero than retargeted image frequency distributions 402-404, the difference of which may indicate alterations of visual data between the original image represented by frequency distribution 401 and the retargeted images represented by frequency distributions 402-404, respectively. The respective differences between 401 and 402-404 may be measured as the $Q_{fsc}$ of each associated retargeted image. As a retargeted image frequency distribution approaches original image frequency distribution 401, the associated $Q_{fsc}$ approaches zero, indicating an increasingly higher quality retargeted image.

Figure 5:
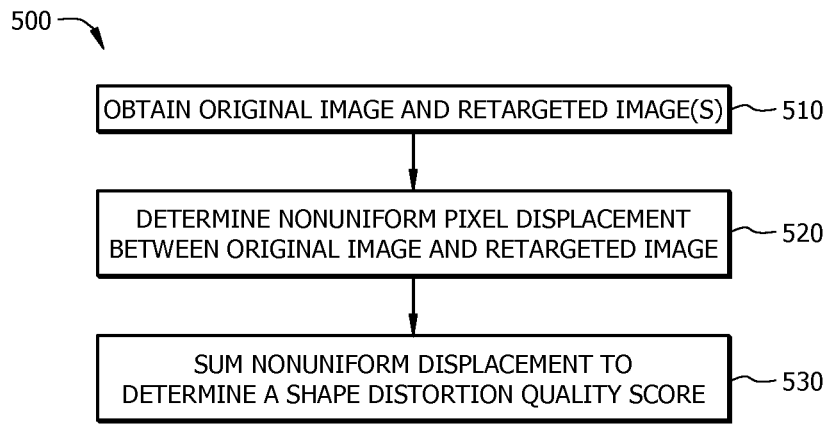
FIG. 5 is a flow chart of a method for determining a shape distortion quality score.

FIG. 5 is a flow chart of a method 500 for determining a shape distortion quality score $Q_{ss}$, for example by shape distortion measurement unit 150. At block 510, method 500 may obtain an original image, such as original image 110 and/or 210, and retargeted images, such as retargeted images 112, 221, and/or 222. At block 520, the method 500 may determine all non-uniform pixel displacement between the original image and the retargeted images. Specifically, when an image is retargeted to a different size, pixels may be displaced to accommodate the imposed size requirements. When a group of pixels that display an image portion are displaced in a uniform manner during retargeting, the resulting retargeted image may comprise the image portion in substantially the same visual shape as the original image portion. Image portions that experience nonuniform pixel displacement during retargeting may result in visual shape distortions. For example, a line may become a curve, a circle may become an ellipse, etc. At block 520, image patches from the original image may be compared in the spatial domain to corresponding image patches from the retargeted images to determine an amount of shape distortion between the images by determining the amount of nonuniform pixel displacement in each patch. Correspondence may be determined using a SIFT flow algorithm. Displacement of a pixel may be determined by taking the square root of a vertical displacement of each pixel squared plus a horizontal displacement of each pixel squared.

At block 530, the method 500 may sum all nonuniform pixel displacement to determine $Q_{ss}$. The displacement of each patch from the original image may be summed and divided by the number of pixels in the original image to determine $Q_{ss}$. $Q_{ss}$ may be expressed using the equation:

$$Q_{ss} = \sum_{(p,q)\in \varepsilon} \sqrt{(v_x(p) - v_x(q))^2 + (v_y(p) - v_y(q))^2}$$

$V_x(p)-V_x(q)$ and $V_y(p)-V_y(q)$ may be the horizontal and vertical displacement, respectively, of a pixel at location p in the original image where q is the spatial neighborhood c of pixel p. An 11×11 spatial neighborhood may be used as the number of pixels may not be sufficient to form a shape if the neighborhood is too small and the pixels may not belong to the same visual object if the neighborhood is too large. $N_O$ may be the number of pixels in the original image. $Q_{ss}$ may express the shape distortion of the retargeted images with a larger value of $Q_{ss}$ representing a more severe aggregate shape distortion.

Figure 6:
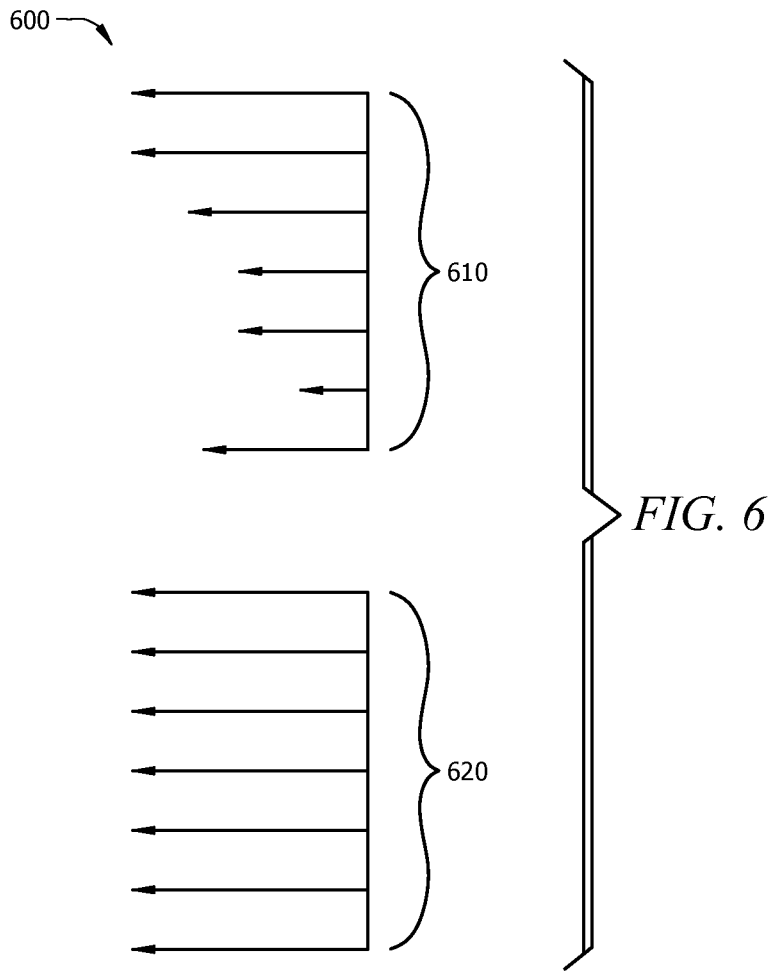
FIG. 6 illustrates graphs of example pixel displacement vectors.

FIG. 6 illustrates graphs 600 of example pixel displacement vectors. Graph 610 may illustrate an example of non-uniform pixel displacement of a retargeted image patch in vector format. In graph 610, pixels in a single image patch may have shifted in the same direction during retargeting, but the intensity of the shift may vary from pixel to pixel. Graph 610 may show nonuniform pixel displacement which may result in image distortion and a may contribute to a larger total $Q_{ss}$ for the retargeted image. In contrast, graph 620 may illustrate an example of uniform pixel displacement of a retargeted image patch in vector format. As shown in graph 620, all pixels in the patch may have shifted in the same direction and to a similar extent during retargeting resulting in no substantial image distortion. Graph 620 may not substantially increase the total $Q_{ss}$ value for the retargeted image.

Figure 7:
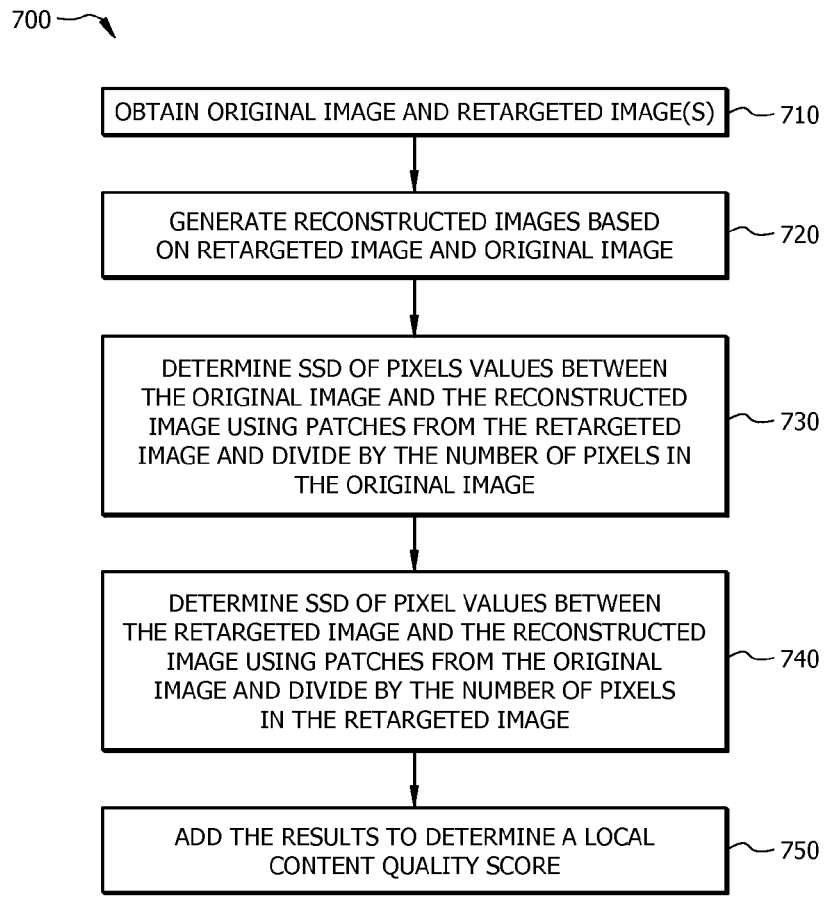
FIG. 7 is a flow chart of a method for determining a local content quality score.

FIG. 7 is a flow chart of a method 700 for determining a local content quality score $Q_{slc}$, for example by a local visual content change measurement unit 160. At block 710, method 700 may obtain an original image, such as original image 110 and/or 210, and retargeted images, such as retargeted images 112, 221, and/or 222. At block 720, the method 700 may generate reconstructed images based on both the retargeted images and the original image. Visual content changes may be modeled using bidirectional similarity to determine the presence of newly created visual data (e.g. added visual artifacts) in a retargeted image and visual data lost in the retargeting process. In order to determine both newly created visual data and visual data losses a reconstructed image may be created both from the original image and the retargeted images at block 720. A reconstructed image may be created from patches and/or information from the retargeted and original images using a patchmatch algorithm. For example the following patchmatch algorithm may be used to create a reconstructed image from a retargeted image:

$$P(p) = \arg\min_{P_R(q)} D(P_O(p), P_R(q))$$

$P_O(p)$ may be an image patch from the original image at position p. $P_R(q)$ may be the image patch from the retargeted image at position q. The reconstructed image from the original image may be created using a similar procedure.

At block 730, the Sum of Squared Differences (SSD) of pixel values between the original image and the reconstructed images may be determined using patches from the retargeted images, the result of which may be divided by the number of pixels in the original image. Local content changes may be determined by determining the average SSD of pixel values in International Commission on Illumination (CIE) L*a*b*

(CIELAB) color space between the original image and a reconstructed image created using image patches from the retargeted images at block 730. At block 740, the SSD of pixel values between the retargeted images and the reconstructed images may be determined using patches from the original image, the result of which may be divided by the number of pixels in the associated retargeted image. The average SSD of pixel values in CIELAB color space between the retargeted images and a reconstructed image created using image patches from the original image may also be determined at block 740. At block 750, the results of block 730 and 740 may be added to determine $Q_{slc}$. The average SSD of pixel values between the original image and a reconstructed image may be added to the average SSD of pixel values between the retargeted images and a reconstructed image at block 750 to determine $Q_{slc}$. $Q_{slc}$ may be expressed using the equation:

$$Q_{slc} = \frac{1}{N_O} D(O, O_R) + \frac{1}{N_R} D(R, R_O),$$

$N_R$ may be the number of pixels in the retargeted images and $N_O$ may be the number of pixels in the original image. $O_R$ may be the reconstructed image created by using image patches from the retargeted images and may be the same size as the original image. Ro may be the reconstructed image created by using image patches from the original image and may be the same size as the reconstructed image. D may be a distance measurement and may be the SSD of pixel values in CIELAB color space. The first portion of the $Q_{slc}$ equation may measure the amount of visual content lost during retargeting. The second portion of the $Q_{slc}$ equation may measure the amount of visual content added during the retargeting process. A larger value of $Q_{slc}$ may represent more local visual content changes.

Figure 8:
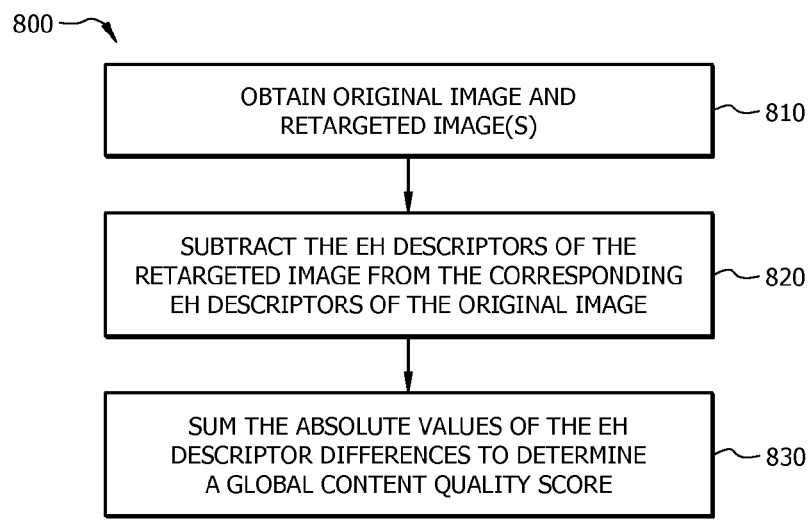
FIG. 8 is a flow chart of a method for determining a global content quality score.

FIG. 8 is a flow chart of a method 800 for determining a global content quality score $Q_{sgc}$, for example by global visual content change measurement unit 170. At block 810, method 800 may obtain an original image, such as original image 110 and/or 210, and retargeted images, such as retargeted images 112, 221, and/or 222. At block 820, the method 800 may subtract Edge Histogram (EH) descriptors associated with a retargeted image from corresponding EH descriptors from the original image to determine the difference in image EH descriptors. An image may be described in terms of EH descriptors, which may be used to describe image textures and may be used in image retrieval and scene change detection operations. A loss of visual data through retargeting may result in a change in EH descriptors between the original image and a retargeted image. EH descriptors may describe an image globally. For example, a given image may be subdivided into 4×4 sub-images. An EH, which may comprise five bins for each sub-image corresponding to the vertical, horizontal, 45 diagonal, 135 diagonal, and isotropic views for each sub-image may be computed. The length of the EH descriptor may be 80 bins and may be independent of the image resolution. EH descriptors may be useful for measuring global content changes as global visual content changes may occur during a scene change and many other scene change detectors may be image resolution dependent. EH descriptors may be used to determine $Q_{sgc}$. $Q_{sgc}$ may be expressed using the equation:

$$Q_{SGC} = \sum_{i=1}^{80} |H_O(i) - H_R(i)|$$

$H_O$ may represent EH descriptor of the original image, $H_R$ may represent EH descriptor of a retargeted image, and the absolute values of the EH descriptor differences may be summed to determine $Q_{sgc}$. An increasing value of $Q_{sgc}$ may indicate an increasing amount of global visual content change. At block 830, the absolute values of the EH descriptor differences may be summed to determine $Q_{sgc}$.

Figure 9:
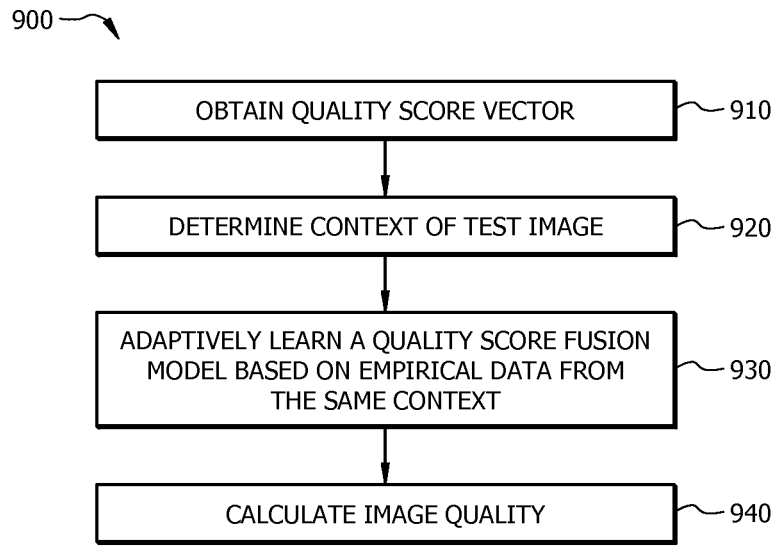
FIG. 9 is a flow chart of a method for adaptively learning a quality score fusion model.

FIG. 9 is a flow chart of a method 900 for adaptively learning a quality score fusion model, which may be used by quality factor integration unit 180 to determine a total score quality score Q from $Q_{fsc}$, $Q_{ss}$, $Q_{slc}$, and $Q_{sgc}$. A value of Q may be determined by adding and/or multiplying $Q_{fsc}$, $Q_{ss}$, $Q_{slc}$, and $Q_{sgc}$ in a linear and/or nonlinear fashion. However, a simple fusion methodology may not adequately express an algorithm that is predictive of user response. Machine learning may be used to determine a fusion model for Q based on empirical data. For example, empirical data may comprise subjective scores given to retargeted images by users. Method 900 may begin at block 910 by obtaining a quality score vector (e.g. $Q_{fsc}$, $Q_{ss}$, $Q_{slc}$, and $Q_{sgc}$) for a given retargeted image, either by calculating or by receiving from another unit. Users may respond differently to retargeted images in different visual contexts. For example, a user may respond more negatively to an image comprising a human face with shape distortion than an image comprising a geographic feature with shape distortion. At block 920, the context of the retargeted images may be determined so that appropriate empirical data may be employed. For example, image recognition software and/or algorithms may be employed to determine if the context of the image an image of a person, an image of a landscape, and image of a structure, etc.

At block 930, a system may adaptively learn a quality factor fusion model based on empirical data from images of the same context as the retargeted images. Various systems may be employed to adaptively learn a quality factor fusion model, for example the Support Vector Regression (SVR) algorithm and/or the Extreme Learning Machine (ELM) algorithm.

For example, SVR may adaptively learn a quality factor fusion model using a training data set $Q_{1\_i}$=($Q_{ss\_i}$, $Q_{slc\_i}$, $Q_{sgc\_i}$, $Q_{fsc\_i}$) where i=1, 2, 3, . . . denotes a plurality of vectors consisting of the four quality scores obtained from the $i^{th}$ retargeted image and $MOS_{1\_j}$ represents the mean of opinion scores given by the subjects for the $i^{th}$ retargeted image. The training process may be expressed to solve the optimization problem with weight vector W and the bias constant b, such that:

$$f(x) = W^T \varphi(x) + b$$

$$\min_{W,b,\xi_1,\xi_2} \frac{1}{2} W^T W + C_e \sum_i (\xi_{1\_i}, \xi_{2\_i})$$

$$\text{subject to} \begin{cases} MOS_{L\_i} - f(Q_{L\_i}) \leq \in +\xi_{1\_i} \\ f(Q_{L\_i}) - MOS_{L\_i} \leq \in +\xi_{2\_i} \\ \xi_{1\_i}, \xi_{2\_i} \geq 0 \end{cases}$$

$$|MOS_{L\_i} - f(Q_{L\_i})| \leq \varepsilon$$

$\xi_{1\_i}$ may be the upper training error and $\xi_{2\_i}$ may be the lower training error subject to an $\epsilon$ insensitive tube defined with $\epsilon$ being a threshold. $\frac{1}{2}W^{T}W$ may be a regularization term used to smooth the function $f(\bullet)$ in order to avoid over fitting. $Ce<0$ may be a penalty parameter of the error term. If a data point satisfies the $MOS_{1\_i}$ equation, the data point may lie within the $\epsilon$ insensitive tube, and the point may be selected as support vector (SV) by SVR.

$$f(x)=w^{T}\phi(x)+b$$

may therefore be rewritten as:

$$f(x) = \sum_{i=1}^{n_{sv}} \eta_i \varphi(Q_{sv\_i})^T \varphi(x) + b$$
$$= \sum_{i=1}^{n_{sv}} \eta_i K(Q_{sv\_i}, x) + b$$

where $n_{sv}$ may be the number of SVs and $K(Q_{sv\_i},x)=\phi(Q_{sv\_i})^T\phi(x)$ may be a kernel function. At block 940, the quality factor fusion model may be employed to compute a Q for a retargeted image based on the quality score vector.

Figure 10:
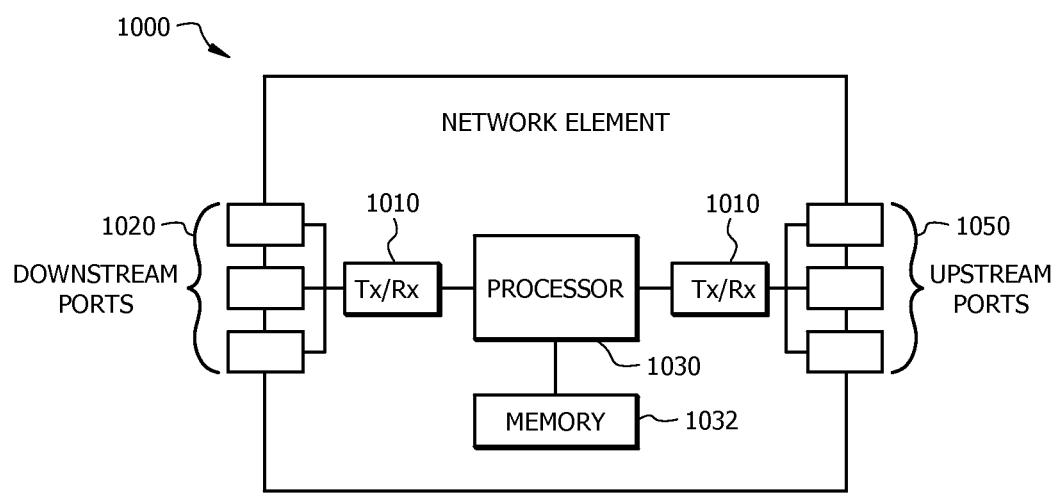
FIG. 10 is a schematic diagram of an embodiment of a Network Element (NE).

FIG. 10 is a schematic diagram of an embodiment of a NE 1000, which may function as a node in a network, for example a server. One skilled in the art will recognize that the term NE encompasses a broad range of devices of which NE 1000 is merely an example. NE 1000 is included for purposes of clarity of discussion, but is in no way meant to limit the application of the present disclosure to a particular NE embodiment or class of NE embodiments. At least some of the features/methods described in the disclosure, for example system 100, units 140, 150, 160, 170, and/or 180, and/or methods 300, 500, 700, 800, and/or 900, may be implemented whole or in part in a network apparatus or component such as an NE 1000. For instance, the features/methods in the disclosure may be implemented using hardware, firmware, and/or software installed to run on hardware. The NE 1000 may be any device that transports frames through a network, e.g., a switch, router, bridge, server, etc. As shown in FIG. 10, the NE 1000 may comprise transceivers (Tx/Rx) 1010, which may be transmitters, a receiver, or combinations thereof. A Tx/Rx 1010 may be coupled to plurality of downstream ports 1020 for transmitting and/or receiving frames from other nodes, a Tx/Rx 1010 coupled to plurality of upstream ports 1050 for transmitting and/or receiving frames from other nodes, and a processor 1030 coupled to the Tx/Rxs 1010 to process the frames and/or determine which nodes to send frames to. The processor 1030 may comprise one or more multi-core processors and/or memory devices 1032, which may function as data stores. Processor 1030 may be implemented as a general processor or may be part of one or more application specific integrated circuits (ASICs) and/or digital signal processors (DSPs). The downstream ports 1020 and/or upstream ports 1050 may contain electrical and/or optical transmitting and/or receiving components. NE 1000 may or may not be a routing component that makes routing decisions.

Figure 11:
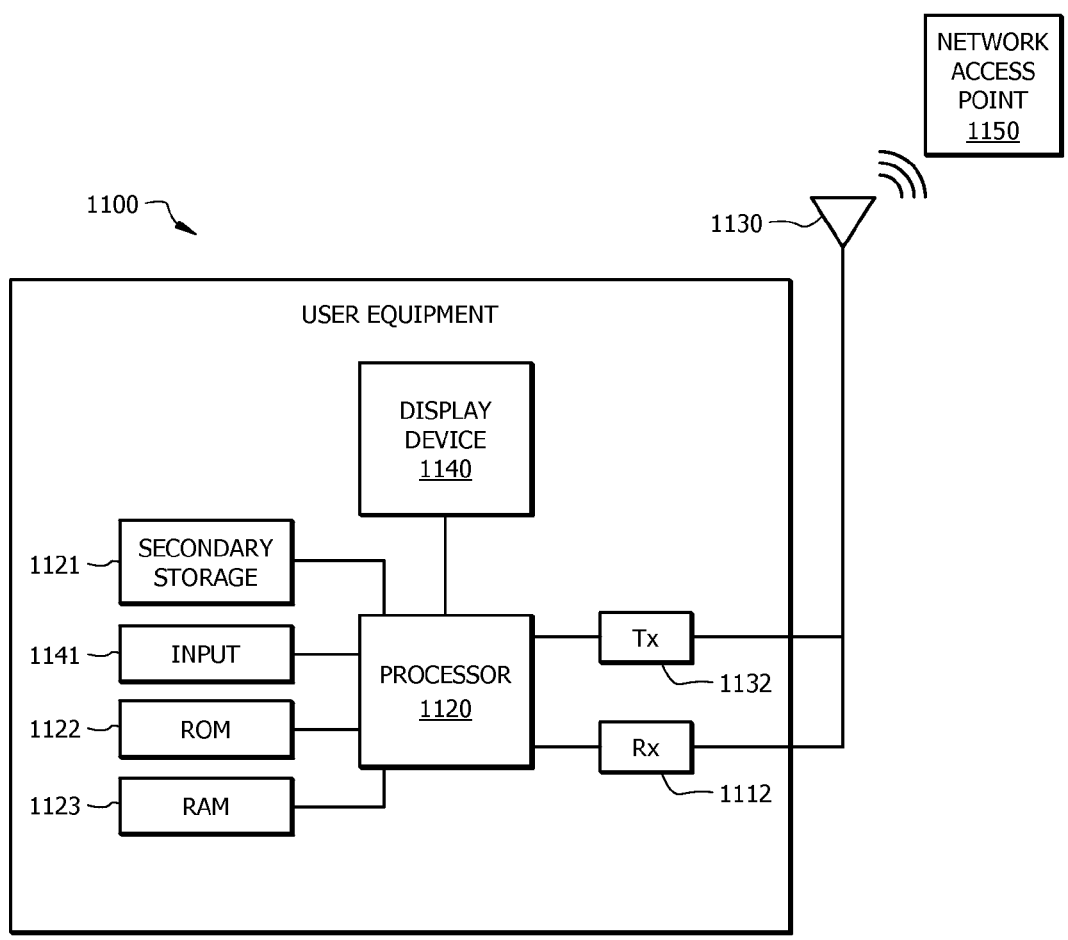
FIG. 11 a schematic diagram of an embodiment of UE.

FIG. 11a schematic diagram of an embodiment of UE 1100. UE 1100 may comprise a two-way wireless communication device having voice and data communication capabilities. In some aspects, voice communication capabilities are optional. The UE 1100 generally has the capability to communicate with other computer systems on the Internet. Depending on the exact functionality provided, the UE 1100 may be referred to as a data messaging device, a two-way pager, a wireless e-mail device, a cellular telephone with data messaging capabilities, a wireless Internet appliance, a wireless device, a smart phone, a mobile device, and/or a data communication device, as examples.

UE 1100 may comprise a processor 1120 (which may be referred to as a central processor unit or CPU) that is in communication with memory devices including secondary storage 1121, read only memory (ROM) 1122, and random access memory (RAM) 1123. The processor 1120 may be implemented as a general processor with one or more CPU chips, one or more cores (e.g., a multi-core processor), or may be part of one or more ASICs and/or DSPs. The processor 1120 may be configured to implement in whole or in part some of the schemes described herein, for example for example system 100, units 140, 150, 160, 170, and/or 180, and/or methods 300, 500, 700, 800, and/or 900, may be implemented using hardware, software, firmware, or combinations thereof.

The secondary storage 1121 may be comprised of one or more solid state drives, disk drives, and/or other memory types and is used for non-volatile storage of data and as an over-flow data storage device if RAM 1123 is not large enough to hold all working data. Secondary storage 1121 may be used to store programs that are loaded into RAM 1123 when such programs are selected for execution. The ROM 1122 may be used to store instructions and perhaps data that are read during program execution. ROM 1122 may be a non-volatile memory device may have a small memory capacity relative to the larger memory capacity of secondary storage 1121. The RAM 1123 may be used to store volatile data and perhaps to store instructions. Access to both ROM 1122 and RAM 1123 may be faster than to secondary storage 1121.

The UE 1100 may communicate data (e.g., packets) wirelessly with a network via a network access point 1150, which may be implemented as a NE 1000. As such, the UE 1100 may comprise a receiver (Rx) 1112, which may be configured for receiving data (e.g. wireless packets or frames) from other components. The receiver 1112 may be coupled to the processor 1120, which may be configured to process the data and determine to which components the data is to be sent. The UE 1100 may also comprise a transmitter (Tx) 1132 coupled to the processor 1120 and configured for transmitting data to other components, for example by using protocols such as Institute of Electrical and Electronics Engineers (IEEE) 802.11, IEEE 802.16, 3rd Generation Partnership Project (3GPP), Global System for Mobile Communications (GSM), or similar wireless protocols. The receiver 1112 and transmitter 1132 may be coupled to a plurality of antennas 1130, which may be configured to receive and transmit wireless radio frequency (RF) signals. In some embodiments, Tx 1132 and Rx 1112 may be replaced by a transceiver comprising the functionality of both Tx 1132 and Rx 1112.

The UE 1100 may also comprise a device display 1140 coupled to the processor 1120, that displays output thereof to a user. The UE 1100 and the device display 1140 may be configured to display representations of data to a user. The device display 1120 may comprise a Color Super Twisted Nematic (CSTN) display, a thin film transistor (TFT) display, a thin film diode (TFD) display, an organic light-emitting diode (OLED) display, an active-matrix OLED display, or any other display screen. The device display 1140 may display in color or monochrome and may be equipped with a touch sensor based on resistive and/or capacitive technologies.

The UE 1100 may further comprise an input device 1141 coupled to the processor 1120, which may allow the user to input commands to the UE 1100. In the case that the display device 1140 comprises a touch sensor, the display device 1140 may also be considered the input device 1141. In addition to and/or in the alternative, an input device 1141 may comprise a mouse, trackball, built-in keyboard, external keyboard, and/or any other device that a user may employ to interact with the UE 1100.

It is understood that by programming and/or loading executable instructions onto the NE 1000, at least one of the processor 1030, memory 1032, Tx/Rx 1010, are changed, transforming the NE 1000 in part into a particular machine or apparatus, e.g., a multi-core forwarding architecture, having the novel functionality taught by the present disclosure. Similarly, it is understood that by programming and/or loading executable instructions onto the UE 1100, at least one of the processor 1102, the ROM 1122, the RAM 1123, secondary storage 1121, transmitter 1132, and/or receiver 1112 are changed, transforming the UE 1100 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a processor; and
   a memory comprising instructions, wherein the instructions cause the processor to perform an image retargeting quality assessment comprising:
   obtaining an original image and a retargeted image, wherein the retargeted image is produced by performing a retargeting algorithm on the original image; and
   comparing the original image and the retargeted image in a frequency domain and in a spatial domain to determine local content changes between the images,
   wherein local content changes between the images is determined by:
      determining an average Sum of Squared Differences (SSD) of pixel values in International Commission on Illumination (CIE) L*a*b* (CIELAB) color space between the original image and a reconstructed image created using image patches from the retargeted image;
      determining the average SSD of pixel values in CIELAB color space between the retargeted image and a reconstructed image created using image patches from the original image; and adding the average SSD of pixel values between the original image and the reconstructed image to the average SSD of pixel values between the retargeted image and a reconstructed image.

2. The apparatus of claim 1, wherein comparing the original image and the retargeted image in the frequency domain comprises comparing original image frequency coefficients and retargeted image frequency coefficients.

3. The apparatus of claim 2, wherein comparing original image frequency coefficients and retargeted image frequency coefficients comprises:
separating the original image frequency coefficients into a plurality of equally spaced bins $f_O(i)$;
separating the retargeted image frequency coefficients into a plurality of equally spaced bins $f_R(i)$ corresponding to $f_O(i)$;
summing a logarithm of the ratio of each $f_O(i)$ to each corresponding $f_R(i)$; and
dividing the sum by the number of bins.

4. The apparatus of claim 3, wherein comparing original image frequency coefficients and retargeted image frequency coefficients comprises computing for integer i=1, 2, ... $N_f$ $$Q_{fsc\_sub} = \frac{1}{N_f} \sum_{i=1}^{N_f} \log \frac{f_o(i)}{f_R(i)},$$

wherein $Q_{fsc\_sub}$ denotes a frequency domain subband quality score and $N_f$ denotes a number of bins.

5. An apparatus comprising:
a processor; and
a memory comprising instructions, wherein the instructions cause the processor to perform an image retargeting quality assessment comprising:
obtaining an original image and a retargeted image, wherein the retargeted image is produced by performing a retargeting algorithm on the original image; and
comparing the original image and the retargeted image in a frequency domain,
wherein the image retargeting quality assessment further comprises comparing the original image and the retargeted image in a spatial domain,
wherein comparing the original image and the retargeted image in the spatial domain comprises comparing the original image and the retargeted image to determine an amount of shape distortion between the images,
wherein the original image comprises a group of pixels representing an object, wherein the retargeted image comprises the group of pixels, and wherein shape distortion comprises non-uniform displacement of the pixels between the original image and the retargeted image,
wherein the amount of shape distortion between the images is determined by:
determining the displacement of each pixel in the original image by taking the square root of a vertical displacement of each pixel squared plus a horizontal displacement of each pixel squared;
summing the displacement of each pixel in the original image; and
dividing the sum by the number of pixels in the original image.

6. The apparatus of claim 5, wherein the amount of shape distortion between the images is determined by computing for pixels at a location p in a spatial neighborhood q:

$$Q_{ss} = \sum_{(p,q)\in\varepsilon} \sqrt{(v_x(p)-v_x(q))^2 + (v_y(p)-v_y(q))^2},$$

wherein $Q_{ss}$ denotes a shape distortion quality score, c denotes all spatial neighborhoods, $(v_x(p)-v_x(q))^2$ denotes horizontal displacement, and $(v_y(p)-v_y(q))^2$ denotes vertical displacement.

7. An apparatus comprising:
a processor; and
a memory comprising instructions, wherein the instructions cause the processor to perform an image retargeting quality assessment comprising:
obtaining an original image and a retargeted image, wherein the retargeted image is produced by performing a retargeting algorithm on the original image; and
comparing the original image and the retargeted image in a frequency domain,
wherein the image retargeting quality assessment further comprises comparing the original image and the retargeted image in a spatial domain,
wherein comparing the original image and the retargeted image in the spatial domain comprises comparing the original image and the retargeted image to determine an amount of shape distortion between the images,
wherein comparing the original image and the retargeted image in the spatial domain further comprises comparing the original image and the retargeted image to determine local content changes between the images, and
wherein local content changes between the images is determined by:
determining an average Sum of Squared Differences (SSD) of pixel values in International Commission on Illumination (CIE) L*a*b* (CIELAB) color space between the original image and a reconstructed image created using image patches from the retargeted image;
determining the average SSD of pixel values in CIELAB color space between the retargeted image and a reconstructed image created using image patches from the original image; and
adding the average SSD of pixel values between the original image and a reconstructed image to the average SSD of pixel values between the retargeted image and the reconstructed image.

8. The apparatus of claim 7, wherein local content changes between the images is determined by computing:

$$Q_{slc} = \frac{1}{N_O}D(O, O_R) + \frac{1}{N_R}D(R, R_O),$$

wherein $Q_{slc}$ denotes a local visual content change quality score, $N_O$ denotes a number of pixels in the original image, $N_R$ denotes the number of pixels in the retargeted image, O denotes the original image, R denotes the retargeted image, $O_R$ denotes a reconstructed image created using image patches from R with the size of O, $R_O$ denotes a reconstructed image created using image patches from O with the size of R, and D( ) denotes a function for determining the SSD of pixel values.

9. The apparatus of claim 1, wherein comparing the original image and the retargeted image in the spatial domain further comprises comparing the original image and the retargeted image to determine global content changes between the images.

10. The apparatus of claim 9, wherein the original image is described by a plurality of Edge Histogram (EH) descriptors, wherein the retargeted image is described by a plurality of EH descriptors that correspond to the EH descriptors of the original image, and wherein global content changes between the images is determined by:
   determining the absolute value of each original image EH descriptor minus each corresponding retargeted image EH descriptor; and
   summing the absolute values.

11. The apparatus of claim 10, wherein global content changes between the images is determined by computing for integer i=1, 2, . . . 80:

$$Q_{SGC} = \sum_{i=1}^{80} |H_O(i) - H_R(i)|,$$

wherein $H_O$ denotes the EH descriptor to the original image and $H_R$ denotes the EH descriptor of the retargeted image.

12. An apparatus comprising:
a processor; and
a memory comprising instructions, wherein the instructions cause the processor to:
   obtain an original image and a retargeted image, wherein the retargeted image is produced by performing a retargeting algorithm on the original image;
   perform an image retargeting quality assessment by comparing the original image and the retargeted image in a spatial domain,
wherein comparing the original image and the retargeted image in the spatial domain comprises comparing the original image and the retargeted image to determine an amount of shape distortion between the images and to determine local content changes between the images,
wherein local content changes between the images is determined by:
   determining an average Sum of Squared Differences (SSD) of pixel values in International Commission on Illumination (CIE) L*a*b* (CIELAB) color space between the original image and a reconstructed image created using image patches from the retargeted image;
   determining the average SSD of pixel values in CIELAB color space between the retargeted image and a reconstructed image created using image patches from the original image; and
   adding the average SSD of pixel values between the original image and a reconstructed image to the average SSD of pixel values between the retargeted image and the reconstructed image.

13. The apparatus of claim 12, wherein the original image comprises a group of pixels representing an object, wherein the retargeted image comprises the group of pixels, and wherein shape distortion comprises nonuniform displacement of the pixels between the original image and the retargeted image.

14. The apparatus of claim 13, wherein the amount of shape distortion between the images is determined by:
   determining the displacement of each pixel in the original image by taking the square root of a vertical displacement of each pixel squared plus a horizontal displacement of each pixel squared;
   summing the displacement of each pixel in the original image; and
   dividing the sum by the number of pixels in the original image.

15. The apparatus of claim 12, wherein comparing the original image and the retargeted image in the spatial domain further comprises comparing the original image and the retargeted image to determine global content changes between the images.

* * * * *

UNITED STATES PATENT AND TRADEMARK OFFICE
CERTIFICATE OF CORRECTION

PATENT NO. : 9,025,910 B2
APPLICATION NO. : 13/713110
DATED : May 5, 2015
INVENTOR(S) : Anmin Liu et al.

It is certified that error appears in the above-identified patent and that said Letters Patent is hereby corrected as shown below:

In the claims:

Column 13, Lines 65-68 through Column 14, Lines 1-9, Claim 6 should read as:

6. The apparatus of claim 5, wherein the amount of shape distortion between the images is determined by computing for pixels at a location p in a spatial neighborhood q:

$$Q_{ss} = \sum_{(p,q)\in\varepsilon} \sqrt{(v_x(p)-v_x(q))^2 + (v_y(p)-v_y(q))^2},$$

wherein $Q_{ss}$ denotes a shape distortion quality score, $\varepsilon$ denotes all spatial neighborhoods, $(v_x(p) - v_x(q))^2$ denotes horizontal displacement, and $(v_y(p) - v_y(q))^2$ denotes vertical displacement.

Signed and Sealed this
Ninth Day of February, 2016

Michelle K. Lee
*Director of the United States Patent and Trademark Office*